United States Patent [19]
Shibata et al.

[11] Patent Number: 4,463,624
[45] Date of Patent: Aug. 7, 1984

[54] TILTABLE STEERING WHEEL

[75] Inventors: Junichi Shibata, Yokosuka; Yuichi Sanada, Tokyo; Shigeo Shingyooji, Yokohama, all of Japan

[73] Assignee: Nissan Motor Company, Limited, Yokohama, Japan

[21] Appl. No.: 199,884

[22] Filed: Oct. 23, 1980

[30] Foreign Application Priority Data

Oct. 26, 1979 [JP] Japan .................. 54-137743

[51] Int. Cl.³ .............................. B62D 1/18
[52] U.S. Cl. .................... 74/493; 280/775
[58] Field of Search ............. 74/493; 280/775

[56] References Cited

U.S. PATENT DOCUMENTS 2,865,222 12/1958 Bachman .
3,028,766 4/1962 Musilli ........................... 74/493
3,718,053 2/1973 Cinadr .

FOREIGN PATENT DOCUMENTS 1581191 12/1969 France .
54-83229 7/1979 Japan .
1445895 11/1976 United Kingdom .

Primary Examiner—Kenneth Dorner
Attorney, Agent, or Firm—Schwartz, Jeffery, Schwaab, Mack, Blumenthal & Koch

[57] ABSTRACT

A tiltable steering wheel for an automotive vehicle includes a steering wheel, a steering shaft, a steering gear, a connecting or intermediate shaft, a steering gear, a connecting or intermediate shaft, means such as a belt fastener for tiltably supporting the steering shaft, and a locking device for locking the steering shaft in a desired position. A rotation axis around which the steering shaft can rotate when tilting the steering wheel intersects or passes near the intersection of a first plane and a second plane when the steering shaft is held in the standard.

6 Claims, 8 Drawing Figures

TILTABLE STEERING WHEEL

BACKGROUND OF THE INVENTION

The present invention relates to a tiltable steering device for a vehicle in which the steering wheel may be conveniently adjusted by the driver.

Tiltable steering devices for vehicles are well known. FIG. 1 schematically shows the alignment and inherent error when tilting one type of prior art tiltable steering device for an automotive vehicle. A steering wheel 1 is connected to the upper end of a steering shaft 2. The lower end of the steering shaft 2 is connected to a steering gear 3 through a connecting shaft 4. The steering gear 3 is fixed relative to the vehicle body (not shown). The upper and lower ends of the connecting shaft 4 are joined through respective universal joints 5, 6 to the steering shaft 2 and the steering gear 3. The steering shaft 2 is supported through a bearing by a steering column (not shown) the lower end portion of which is rotatably provided through a resilient member 30 such as rubber about a rotation point 11. A locking or clamping mechanism (not shown) is attached to an intermediate portion of the steering column for clamping the steering wheel 1 in any one of various predetermined positions. For example, the steering wheel 1 and the steering shaft 2 are adjustable within range between the uppermost position II and the lower most position III. The reference I designates a standard position of the steering wheel 1. When the position of the steering wheel 1 is adjusted, the universal joint 5 and the lower end of the steering shaft 2 rotate about the rotation axis 11 with the radius R1, and the upper end of the connecting shaft 4 rotates about the universal joint 6 with the radius R2. As a result, a gap L is formed between the lower end of the steering shaft 2 and the upper end of the connecting shaft 4. Such a gap L can be absorbed by the resilient member 30.

However, provision of such a resilient member increases the production costs of the steering device and decreases the rigidity of the steering device as a whole.

SUMMARY OF THE INVENTION

It is an object of the present invention to provide an adjustable tiltable steering device for vehicles such as automobiles, trucks and the like in which a gap between the upper end of a connecting shaft and the lower end of a steering shaft can be minimized without the need for a resilient member such as a rubber, when the steering wheel is adjusted.

A further object of the present invention is to provide a tiltable steering device for a vehicle having improved rigidity.

Still a further object of the present invention is to provide a tiltable steering device for a vehicle in which its production cost is low.

According to the present invention, a tiltable steering wheel for an automotive vehicle includes a steering wheel, a steering shaft, a steering gear, a connecting or intermediate shaft, means such as a belt fastener for tiltably supporting the steering shaft, and a locking device for locking the steering shaft in a desired position. A rotation axis around which the steering shaft can rotate in tilting the steering wheel intersects or passes near the intersection of a first plane and a second plane when the steering shaft is held in the standard position, the first plane being vertical and including the axis of the steering shaft, the second plane being at a right angle to the first plane and including the axis of the connecting shaft.

BRIEF DESCRIPTION OF THE DRAWINGS

These and other objects, features and advantages of the present invention will become more apparent from the following description of a preferred embodiment thereof when read in conjunction with the accompanying drawings in which.

DETAILED DESCRIPTION OF THE PREFERRED EMBODIMENT

Figure 1:
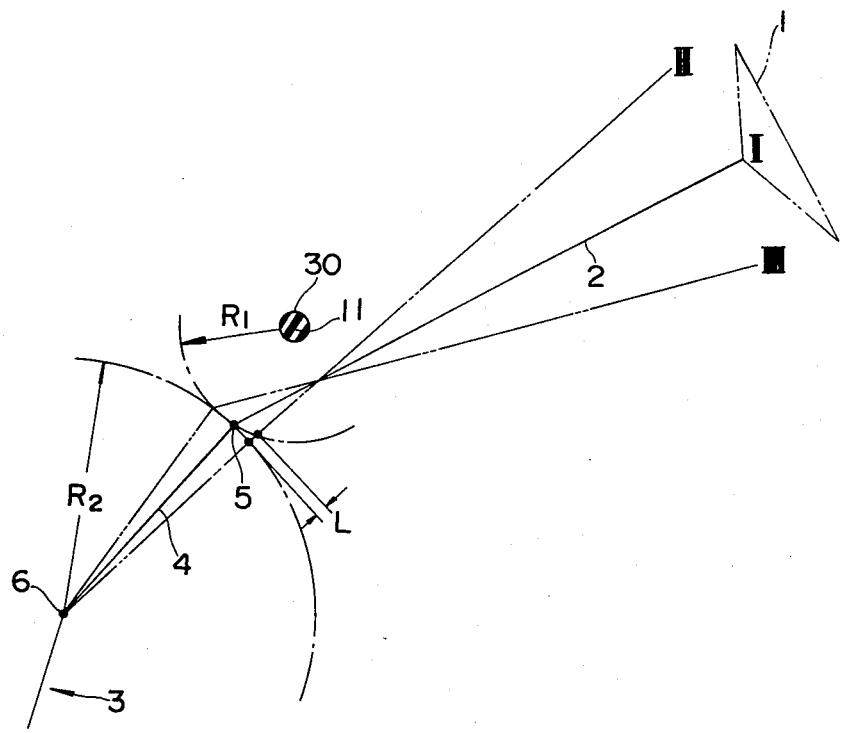
FIG. 1 is a schematic view for explaining the operation of a prior art tiltable steering device.

Referring now to FIGS. 2 through 6, a tiltable steering device for an automotive vehicle according to a preferred embodiment of the present invention will be described. Through the figures, like parts and elements are designated by the same reference numerals.

Figure 3:
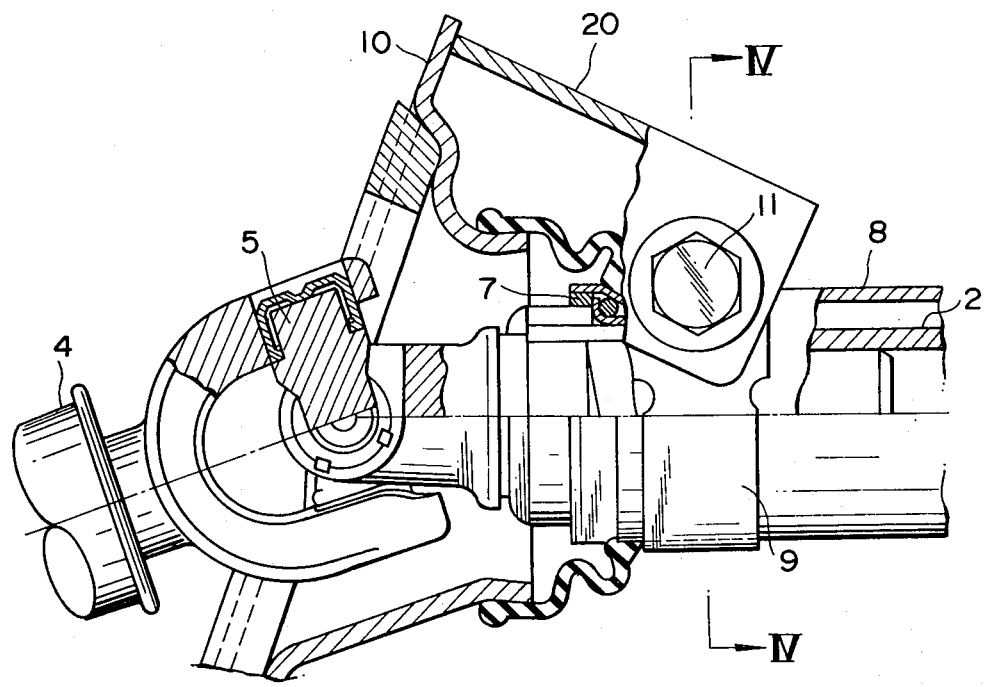
FIG. 3 is a sectional enlarged view showing the lower portion of a steering shaft in the steering device as shown in FIG. 2.
Figure 4:
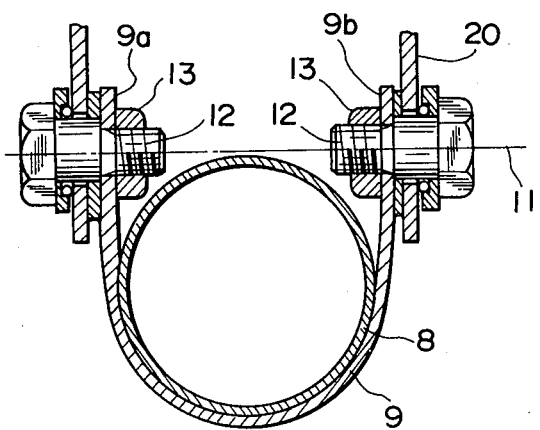
FIG. 4 is a sectional view taken along the line IV—IV in FIG. 3.

The steering wheel 1 is fixed to the upper end of the steering shaft 2 which is connected through the intermediate or connecting shaft 4 to the steering gear 3 fixed relative to the vehicle body 10. The upper and lower ends of the connecting shaft 4 are joined through respective universal joints 5 and 6 to the lower end of the steering shaft 2 and the upper end of the steering gear 3. A steering column 8 supports the steering shaft 2 through a bearing 7 as shown in FIG. 3. A U-shaped belt fastener 9 is fixed at its intermediate portion to the lower portion of the steering column 8 by welding, as shown in FIG. 4. Both legs 9a, 9b of the belt fastener 9 are rotatably secured to a bracket 20 fixed to the vehicle body 10 by bolts 12 and nuts 13. Thus, the steering shaft 2 may rotate about the rotation axis 11, as the lower portion of the steering column 8 is rotatably mounted to the vehicle body 10.

Figure 5:
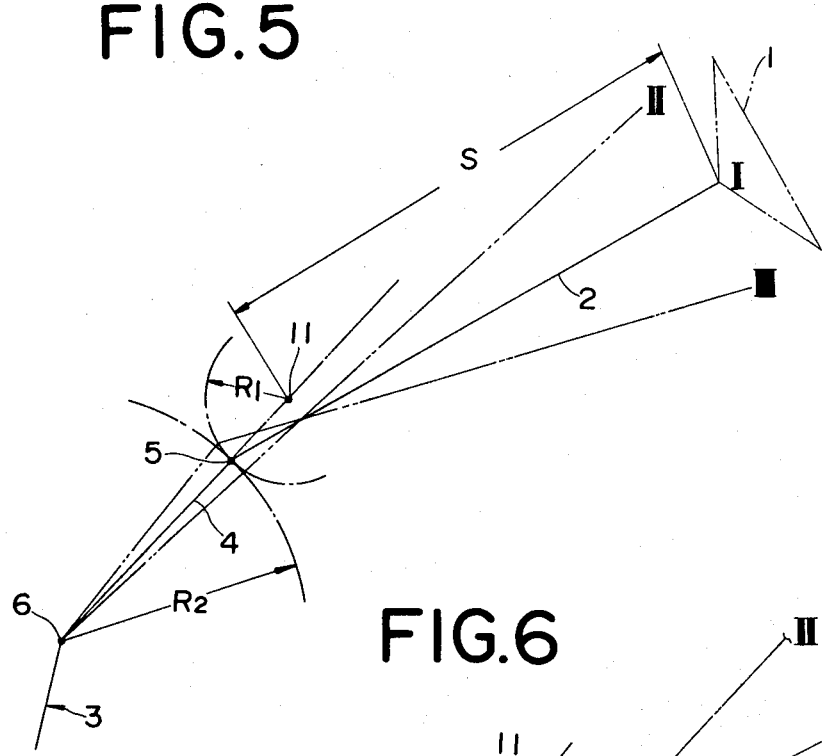
FIG. 5 is a schematic view for explaining the operation of the steering wheel as shown in FIG. 2.

As shown in FIG. 5, in the standard position I set at the center of the range for adjusting the position of the steering wheel 1, the rotation axis 11 of the steering shaft 2 intersects or passes near the intersection of a first plane and a second plane. The first plane is vertical and includes the axis of the steering shaft 2. The second plane is at a right angle to the first plane and includes the axis of the connecting shaft 4.

Figure 2:
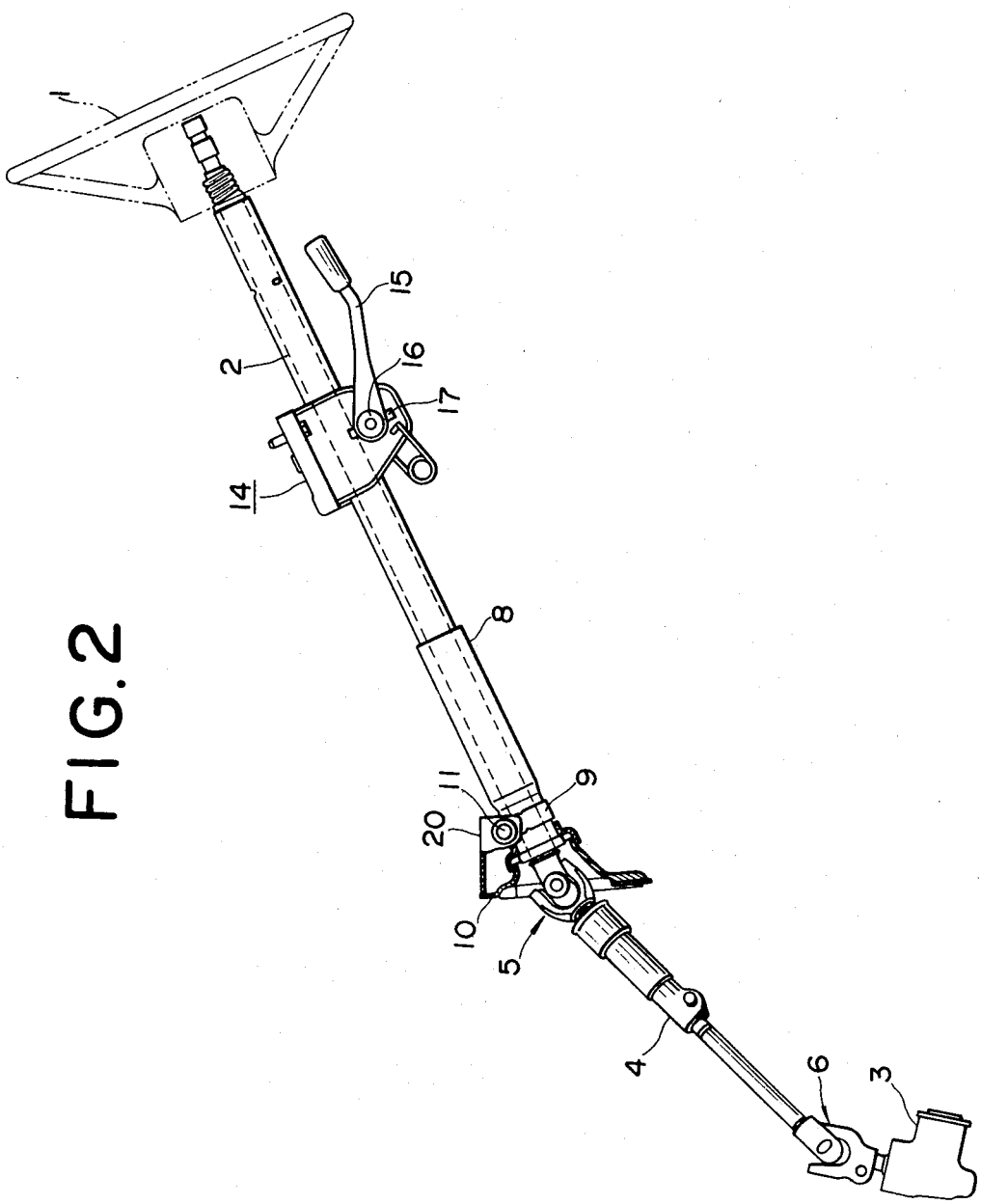
FIG. 2 is a side view showing a tiltable steering device according to a preferred embodiment of the present invention.

In FIG. 2, 14 denotes a locking mechanism for locking the steering wheel 1 in a desired position by a handle 15. By actuating the handle 15, a lock nut 16 is loosened so that the steering column 2 can move upwardly or downwardly within a slot 17.

As shown in FIG. 5, when the position of the steering wheel 1 is adjusted upwardly or downwardly from the standard position I, the moving range of the lower end of the steering shaft 2 around the rotation point 11 with the radius R1 is small as compared with the moving range of the steering wheel 1 in its upward or downward tilting. As a result, the moving line of the upper end of the connecting shaft 4 about the universal joint 6 with the radius R2 slightly differs from the moving line of the lower end of the steering shaft 2. That is, the distance L' at the universal joint 5 between the upper end of the connecting or intermediate shaft 4 and the lower end of the steering shaft 2 is small in any position thereof, so that it can be disregarded from the viewpoint of precision thereof.

Figure 6:
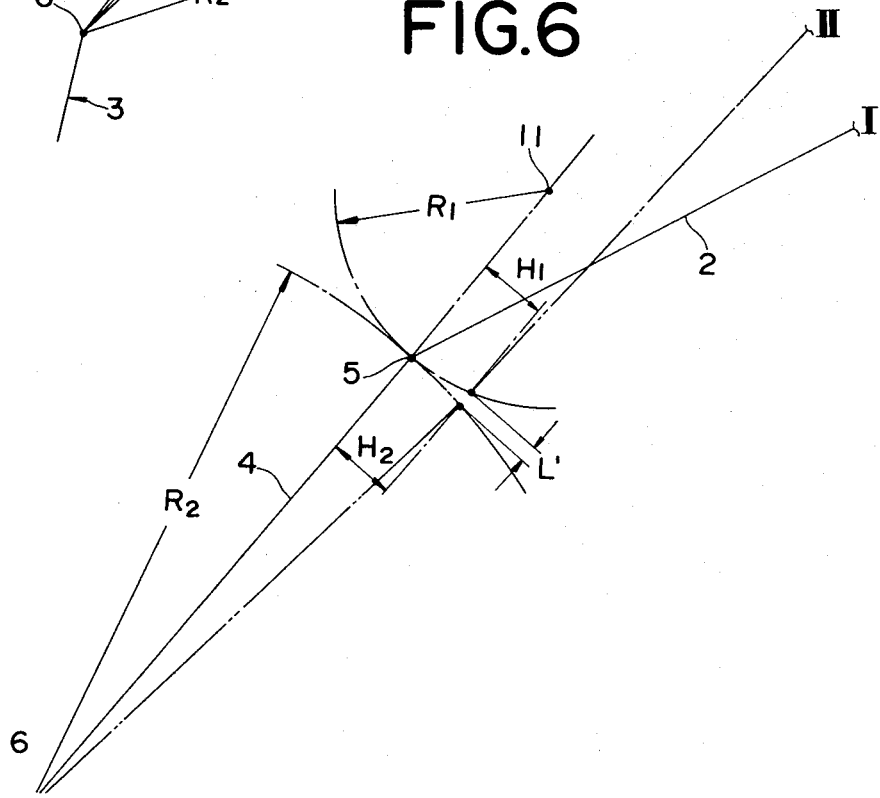
FIG. 6 is an enlarged schematic view showing a part of the view as shown in FIG. 5.
Figure 7:
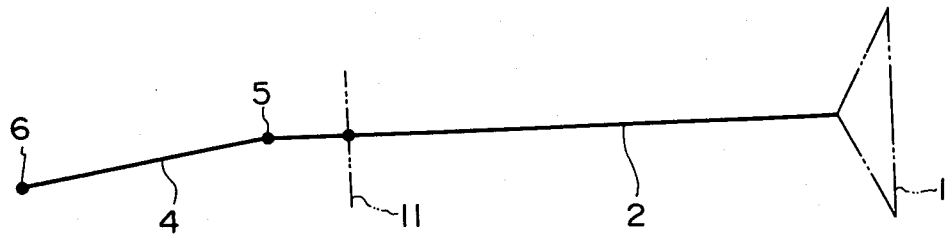
FIG. 7 is a diagramatic plan view showing the position of the rotation axis of a steering shaft in the steering device.
Figure 8:
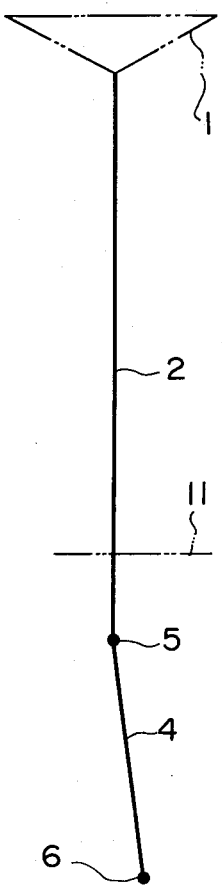
FIG. 8 is a diagramatic front view showing the position of the rotation axis of the steering shaft.

Referring to FIGS. 5 and 6, for example, assume that the radius R1 is 50 mm; R2 is 300 mm; the distance S between the steering wheel 1 and the rotation point 11 is 650 mm; the tilting angle of the steering wheel 1 is ±2° with respect to the line between the rotation axis 11 and the center line of the steering wheel 1, which corresponds to approximately 23 mm in a vertical direction at the steering wheel 1; the rotation axis 11 and the universal joints 5, 6 are positioned in the same straight line; and H1 is approximately equal to H2. The following equation can be obtained:

$$H1 = R1 \sin 2° = 1.745 \text{ (mm)} = H2$$

$$L' = (R1 - \sqrt{R1^2 - H1^2}) + (R2 - \sqrt{R2^2 - H2^2})$$

$$= 0.036 \text{ (mm)}$$

The distance L' of 0.036 mm can be disregarded in view of the required precision of the parts. Thus, it is not necessary to provide a rubber insulator or the like to absorb the gap formed by the different movements of the steering shaft 2 and the connecting shaft 4 at the universal joint 5 in the steering wheel's tilting.

As can be seen from the foregoing, according to the present invention, a rubber insulator or the like is not used for the purpose of absorbing the gap formed between the lower end of the steering shaft and the upper end of the connecting or intermediate shaft when the steering wheel is tilted to a desired position. Therefore, the production cost can be decreased, and the rigidity of the steering mechanism can be increased.

What is claimed is:

1. A tiltable steering device for a vehicle having a vehicle body, comprising:
   a steering wheel;
   a steering shaft having its upper end fixed to the steering wheel;
   a steering column for rotatably supporting the steering shaft;
   a connecting shaft having its upper end connected through a universal joint to the lower end of the steering shaft;
   means for tiltably supporting the steering column in such a way that the steering shaft can be tilted from a standard position upwardly or downwardly within a predetermined range around a rotation axis, the standard position being at the center between the upper and lower limits of steering wheel adjustment;
   the improvement including:
   the rotation axis of the steering shaft being positioned above and apart from the universal joint and intersecting, at a point, the straight line formed by the intersection of a first plane and a second plane when the steering shaft is held in said standard position, the first plane being vertical and including the axis of the steering shaft, the second plane being at a right angle to the first plane and including the axis of the connecting shaft.

2. The steering device of claim 1, wherein the steering shaft is supported by a steering column through a bearing.

3. The steering device of claim 2, wherein a U-shaped belt fastener is fixed at its lower portion to a lower portion of the steering column.

4. The steering device of claim 3, wherein the fastener has a pair of legs rotatably secured to a bracket fixed to the vehicle body.

5. The steering device of claim 4, wherein the fastener is rotatably supported by a bolt.

6. The steering device of claim 5, wherein the bolt is positioned in the rotation axis.

* * * * *